July 7, 1936.   G. B. GILTNER   2,047,065
TAIL SET
Filed Nov. 21, 1934   2 Sheets-Sheet 1
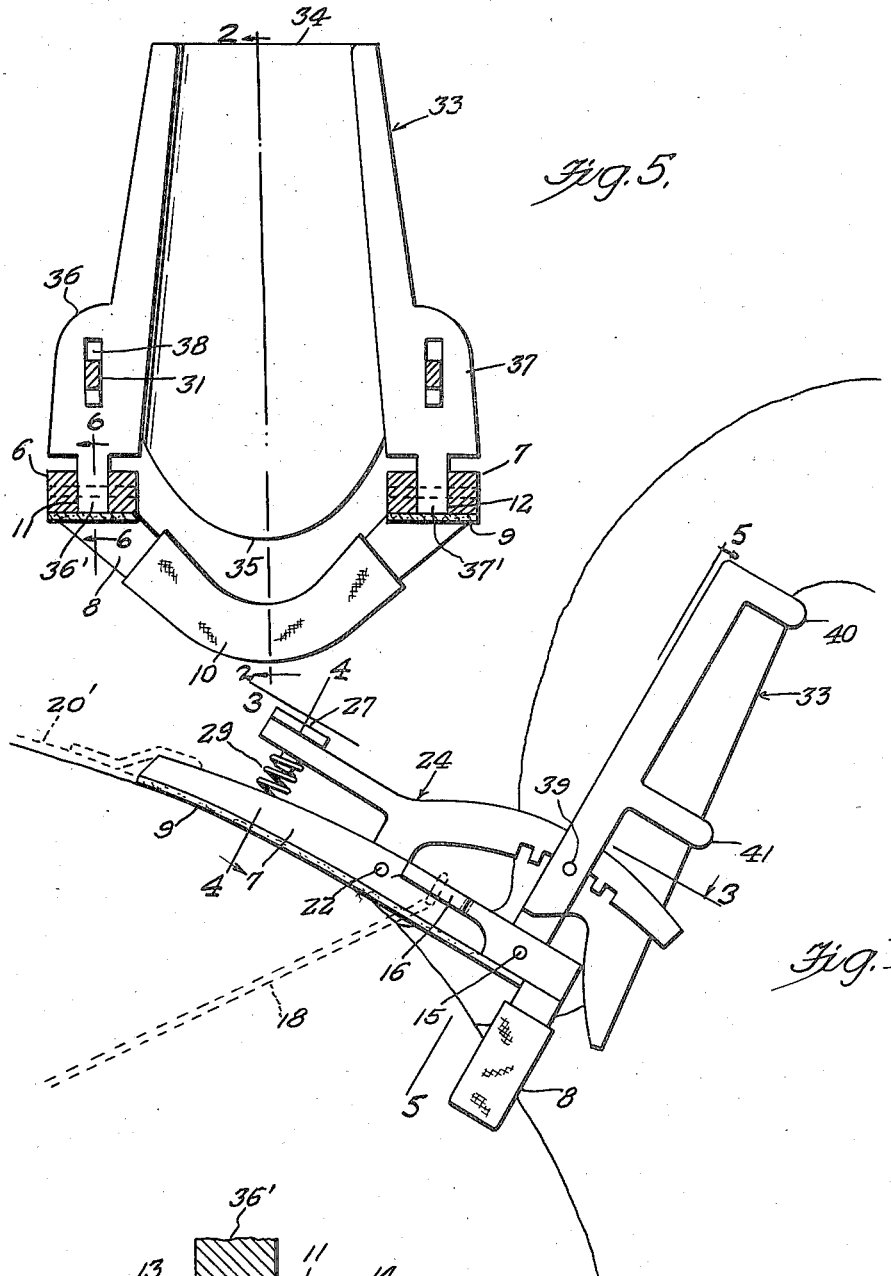
Inventor
Gideon B. Giltner,
By Clarence A. O'Brien
Attorney

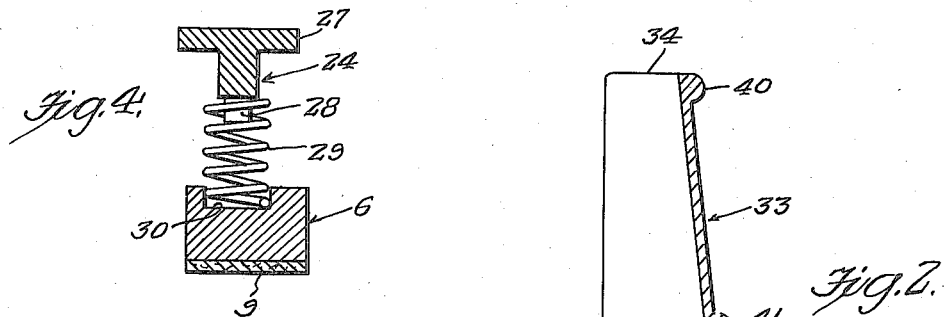
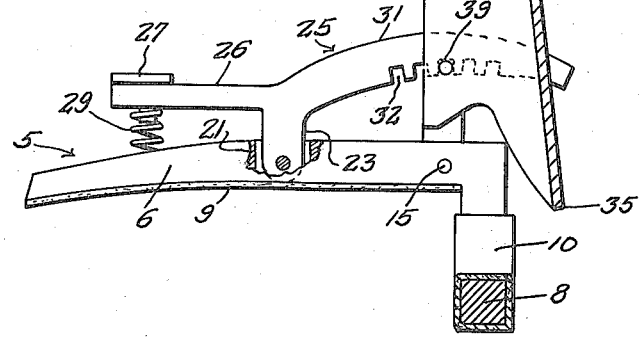
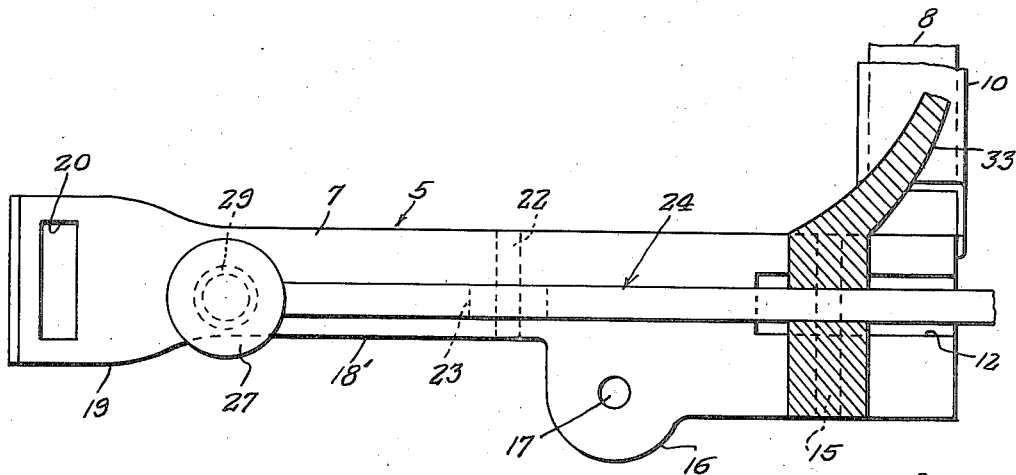

Patented July 7, 1936

2,047,065

UNITED STATES PATENT OFFICE 2,047,065

TAIL SET

Gideon Blackburn Giltner, Estill Springs, Tenn.

Application November 21, 1934, Serial No. 754,107

4 Claims. (Cl. 54—78)

My invention relates generally to tail sets for holding and training the tails of animals, particularly the tails of horses, and an important object of my invention is to provide an extremely light weight, comfortable tail set which does not require to be connected to parts of the harness by straps from the belly and back of the horse.

Another important object of my invention is to provide a tail set of the character indicated above which is placed in position under the tail of the horse and over that portion of the back next to the tail so as to rest on the heavy muscles of the back next to the tail and present a large bearing surface thereto, so as to avoid chafing and injury to the back of the animal which is characteristic of present types of tail sets.

Another important object of my invention is to provide a tail set of the character indicated which can be adequately held in place by a strap similar to the turn-back on the harness and a light sway.

Another important object of my invention is to provide a tail set capable of holding and training dead tails and crooked tails, and forming them with comfort to the horse into the desired "water-spout" type of tail, and permit the animal to sit or lie down with comfort.

Other objects and advantages of my invention will be apparent from a reading of the following description in connection with the drawings, wherein for purposes of illustration I have shown a preferred embodiment of my invention.

In the drawings:—

Figure 1 is a side elevational view of the device showing it applied to the back and tail of a horse.

Figure 2 is a longitudinal vertical sectional view of Figure 5 taken on the line 2—2 thereof.

Figure 3 is an enlarged horizontal sectional view through one side of the tail holder only taken on line 3—3 of Figure 1.

Figure 4 is a transverse vertical sectional view taken through the left hand part of Figure 1 on the line 4—4 thereof.

Figure 5 is a transverse vertical sectional view taken through Figure 1 to the left of the tail holder on line 5—5 thereof.

Figure 6 is a longitudinal sectional view taken through the right hand part of Figure 5 on line 6—6 thereof.

Referring in detail to the drawings, the numeral 5 refers generally to the U-shaped base of the device which is preferably made of aluminum or other equivalent light weight material, and which is composed of the right hand leg 6 and the left hand leg 7, the legs being joined at their rear ends by the generally semi-circular bight portion 8 which depends from the rear end of the legs.

The legs are curved on their under surface and also on their upper surface, the curvature of the upper surface being for convenience while the curvature of the lower surface is arranged to conform with the curvature of the back of the animal just forward of and on opposite sides of the tail, and this under surface may be provided with a suitable cushion or pad 9 and similar cushioning material may be used to cover the bight position 8 as indicated at 10, so as to present a comfortable contact with the animal.

At the rear ends of the arms 6 and 7 there are provided slots 11 and 12, respectively, each of which has the right angular forward end 13 and the upwardly and rearwardly angulated rear end 14. A pivot 15 traverses each of the slots 11 and 12 forward of the rear angulated end 14 and rearwardly spaced from the right angular end 13. Each of the legs is of generally flat construction and has at its rear end and extending to an intermediate point thereof the lateral relatively thin lugs 16 which are each provided with a hole 17 for attaching the rear upper end of the sway straps 18. Forwardly of the lugs 16 the legs 6 and 7 have a relatively narrow part 18' whose forward end portion is slightly increased in width as indicated at 19 and provided with a transversely elongated slot 20 arranged for connection of the light straps 20' which run along the back of the horse.

Forward of the respective lugs 16 the legs are provided with a slot 21 traversed by a pivot 22 which pivotally mounts in the slot 21 the lower end of the depending member 23 of the corresponding latch 24, 25.

Each latch has besides the depending member 23 the forwardly projecting straight part 26 which has on its front end the enlarged button 27 under which is located a pin 28 which seats in the upper end of a helical spring 29 seated in a recess 30 in the top of the legs 6 and 7 as particularly well shown in Figures 2 and 4. Extending rearwardly from the member 23 and from the rear end of the straight part 26 there is an arcuate part 31 which has along an intermediate part of its lower edge the series of notches 32. The latches are preferably formed of bronze or of some other suitable non-rusting and non-corroding metal.

The tail holder which is generally designated 33 and is preferably made of cast aluminum or other suitable light weight material, is of tapering semi-circular cross section, having its upper and smaller end cut off approximately at right angles as indicated at 34 and having its lower end formed in the shape of a beaver tail as indicated at 35.

At the lower end of the tail holder and on the opposite side edges thereof are lateral enlargements 36, 37 each of which contains a vertical slot 38 in which slides and works the corresponding notched part 31 of the respective latch. Across each of the slots 38 is a pin 39 with which the teeth of the corresponding latches engage, each latch being normally pushed by its spring 29 so as to engage the pin 39 unless released by the exertion of downward pressure on the respective buttons 27.

It is obvious that this arrangement will normally preserve the angulation given to the tail holder 33, and that the angulation of the tail holder may be changed simply by disengaging some of the teeth 32 from the pin 39 and reengaging the pin with others of said teeth or notches. It will also be observed that extreme pressure is not required to release the tail holder for adjustment purposes, and that this arrangement avoids the direct pull which is necessary to raise and lower other previous tail sets, which is painful to the animal.

Due to the metallic construction of aluminum and bronze, the drawbacks of rust and corrosion are entirely eliminated. The back part which is constituted by the padded part 8 acts as a crupper. The large and hence comfortable bearing surface of the member 5 on the back of the animal is especially to be emphasized in contrast to the relatively small bearing surface afforded by other styles of tail sets, which cause injury to the horse.

Depending from the center of the enlargements 36 and 37 on the tail holder 33 are the reduced lugs 36' and 37' which turn in the slots 11 and 12 on the pivots 15. The lugs are adapted to engage the angulated ends 14 of these slots when in the extreme right hand position so as to be prevented from falling farther toward the rear, even while the latches are disengaged from the tail holder.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

What is claimed is:—

1. A tail set of the class described, comprising a substantially U-shaped base part forming a pair of forwardly extending limbs and a bight which is bowed downwardly, a tail holder of substantially semi-circular shape in cross section and having extensions at the sides of its lower end, means for pivoting said extensions to the rear portions of the limbs and latch means for holding the tail holder in adjusted position.

2. A tail set of the class described, comprising a substantially U-shaped base part forming a pair of forwardly extending limbs and a bight which is bowed downwardly, a tail holder of substantially semi-circular shape in cross section and having extensions at the sides of its lower end, means for pivoting said extensions to the rear portions of the limbs and latch means for holding the tail holder in adjusted position, and such latch means including a bar having a depending portion intermediate its ends, means for pivoting said depending portion to one of the limbs of the base intermediate the ends of said limb, the rear portion of the bar being of arcuate shape with its concave edge lowermost and said edge having teeth therein, a side portion of the tail holder having a slot therein through which the arcuate shape of the bar passes, and a pin passing through the slot for engagement by the teeth of the bar, and a spring located between the front end of the bar and said limb for normally holding the bar in latching position.

3. A tail set of the class described, comprising a substantially U-shaped base part forming a pair of forwardly extending limbs and a bight which is bowed downwardly, a tail holder of substantially semi-circular shape in cross section and having extensions at the sides of its lower end, means for pivoting said extensions to the rear portions of the limbs and latch means for holding the tail holder in adjusted position, and ribs on the rear side of the tail holder.

4. A tail set of the class described, comprising a substantially U-shaped member forming a pair of limbs and a bight which is bowed downwardly for passing under the tail of a horse, each limb having a slot in its rear portion provided with a straight front wall and an upwardly and rearwardly sloping rear wall, a tail holder of substantially semi-circular shape in cross section having extensions at its lower end fitting in the slots and pivoted therein, latch means for holding the tail holder in adjusted position.

GIDEON BLACKBURN GILTNER.